April 29, 1952     R. S. HUNTER     2,594,310
SIGNALING MIRROR

Original Filed July 14, 1944          2 SHEETS—SHEET 1

INVENTOR
RICHARD S. HUNTER
BY H. L. Godfrey
ATTORNEY

April 29, 1952     R. S. HUNTER     2,594,310
SIGNALING MIRROR
Original Filed July 14, 1944     2 SHEETS—SHEET 2

*Fig. 3.*

TARGET     SUN

*Fig. 4.*

TARGET     SUN

RICHARD S. HUNTER

INVENTOR

BY H. L. Godfrey

ATTORNEY

Patented Apr. 29, 1952

2,594,310

UNITED STATES PATENT OFFICE 2,594,310

SIGNALING MIRROR

Richard S. Hunter, Franklin Park, Va., assignor to the United States of America as represented by the Secretary of Commerce Original application July 14, 1944, Serial No. 544,969. Divided and this application October 10, 1949, Serial No. 120,582

3 Claims. (Cl. 116—20)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (ch. 460, 45 Stat. L. 467).

The invention relates to an improved signaling mirror by means of which a reflected beam of sunlight may be accurately and quickly directed from life rafts or small water craft upon an aircraft, water craft, lighthouse or the like, as well as for signaling on land, as between survey parties. This application is a division of my copending application, Serial No. 544,969, filed July 14, 1944, now U. S. Patent No. 2,504,982 for Signaling Mirrors.

In the accompanying drawings:

Figure 3 is a diagrammatic view showing the direction of reflection and refraction of the sun to the sender's eye.

Figure 4 is a diagram showing the directions of reflection from the mirror and surface of the color screen.

Figure 1:
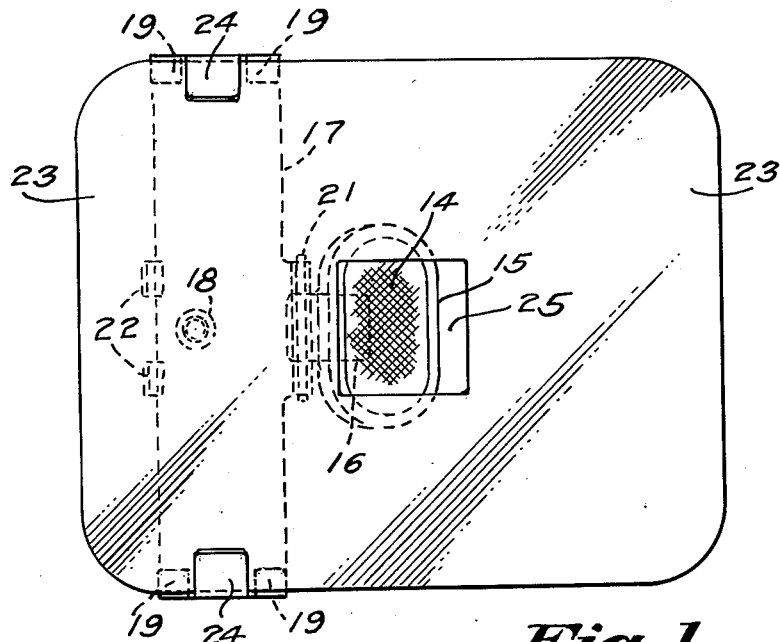
Figure 1 is a top plan view of my device.

In these drawings the mirror comprises a clear glass sheet 11 having a reflecting back 12 in which there is a sighting opening 13. A retrodirective reflector 14 in a frame 15 is mounted on a hinge 16 having an attaching leaf 17 which is secured to the mirror by means of a tubular rivet 18 which fits in a hole in the glass sheet 11 and a mirror engaging clamp 19. The tubular rivet 18 also serves as a means for securing a suitable suspending cord not illustrated in this divisional application.

Figure 2:
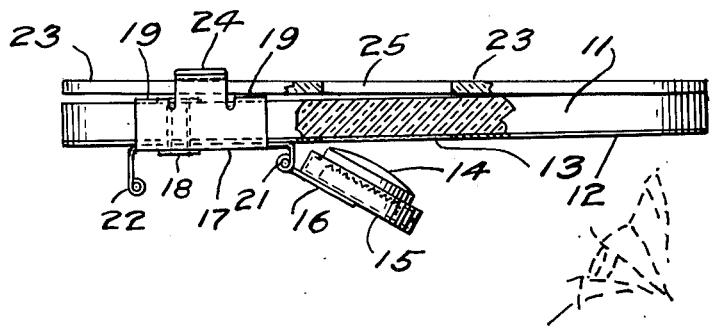
Figure 2 is a side elevation, partly in section, showing my device with one of my color screens in operative position.

The reflector 14 is shown in operative position in Figures 1 and 2, the latter view showing that the retrodirective reflector makes an acute angle with the mirror and also showing the pintle 21 of the hinge 16 at a distance from the mirror back 12 less than the thickness of the reflector 14 and frame 15. This predetermined distance of the pintle 21 from the mirror back fixes the minimum acute angle between the mirror and the frame 15 of the retrodirective reflector 14. My signaling mirror would be operative if the hinge 16 were eliminated and a rigid attachment substituted for it, but the hinge makes possible folding my retrodirective reflector about the pintle 21. Two resilient catches 22 releasably hold it in inoperative position when the device is transported or stored.

A color screen 23 (Figures 1, 2 and 4) provided with an opening 25 corresponding with the window 13 is detachably secured in front of the mirror by a pair of resilient clips 24 with a substantial linear contact with the right-hand edge of the figure but elsewhere held at a slight angle with the mirror by the clamps 19. This is for the purpose of separating the colored beam of reflected light from the white light reflected from the front surface of the color screen, as indicated in Figure 4. This separation of the colored and uncolored beams of reflected light I have found necessary to avoid a serious dilution of the color of the transmitted signal.

Figures 3 and 4 diagrammatically illustrates the operation of my device in which adjusted position rays of the sun strike my mirror at an angle oblique to the vertical and are reflected to a target (such as an airplane, not shown) on the opposite side of the vertical and making an angle equal to the first oblique angle, as is well known in optics.

However, without some means for directing this reflected light at the target, it is a matter of chance and accident whether or not the sender of a distress signal may attract the attention of an airplane pilot. My device provides a means for forming for the sender a virtual image of the sun, which image shifts as the mirror is tilted. The virtual image of the sun is produced by refraction and reflection of a portion of the sunbeam which falls within the sighting opening 13. These rays of sunlight pass through the glass sheet 11, and leave the glass to fall on the retroreflector 14. This retroreflector exactly reverses the directions of rays which strike it, therefore the beam of sunlight returns to the window 13 where a portion is reflected to the eye of a sender, indicated in dotted lines, and produces in his eye a virtual image of the sun which appears to him as a luminous disk in the direction from which these reflected rays approach his eye. This direction, as can be seen in Figure 3, is the direction in which reflected rays of sunlight leave the plane mirror 11, 12. This virtual image therefore indicates to the observer the direction of his mirror-reflected signal of sunlight.

When he turns the mirror to superimpose this image of the sun upon the target, he knows that his signal is properly directed.

It should be understood that the present disclosure is for the purpose of illustration and that the invention includes all modifications and equivalents which fall within the spirit and scope of the appended claims in which it is my intention to claim all novelty inherent in my invention as broadly as possible in view of the prior art.

What is claimed is:

1. A signaling device including a mirror having a window of transparent refractive material, a retrodirective reflector facing said window and nonparallel with said mirror, the improvement which comprises a color shield having an opening corresponding with the window of said mirror and means for operatively uniting said color screen over said mirror and at a slight angle thereto.

2. A signaling device including a mirror having a window of transparent refractive material, a retrodirective reflector facing said window at an acute angle, the improvement which comprises a color screen having an opening in alignment with said window and means for detachably uniting said mirror and screen with all parts of the surface of the screen mounted at a slight angle with the plane of said mirror.

3. In combination with a signaling device comprising a mirror having a window of transparent refractive material and a retro-directive reflector facing said window, the improvement which includes a color screen having an opening in alignment with said window and a plurality of resilient clips for mounting said screen over said mirror with the color screen held at a slight angle with the plane of said mirror.

RICHARD S. HUNTER.

REFERENCES CITED

The following references are of record in the file of this patent:

UNITED STATES PATENTS

| Number | Name | Date |
|---|---|---|
| 2,412,616 | Hunter | Dec. 17, 1946 |
| 2,467,165 | Stimson | Apr. 12, 1949 |

FOREIGN PATENTS

| Number | Country | Date |
|---|---|---|
| 117,760 | Australia | Nov. 10, 1943 |